US012017819B2

(12) United States Patent
Wallace, Jr.

(10) Patent No.: US 12,017,819 B2
(45) Date of Patent: Jun. 25, 2024

(54) MIXING BOTTLE AND METHOD THEREFOR

(71) Applicant: Robert F. Wallace, Jr., High Point, NC (US)

(72) Inventor: Robert F. Wallace, Jr., High Point, NC (US)

( * ) Notice: Subject to any disclaimer, the term of this patent is extended or adjusted under 35 U.S.C. 154(b) by 457 days.

(21) Appl. No.: 17/348,150

(22) Filed: Jun. 15, 2021

(65) Prior Publication Data

US 2022/0396397 A1 Dec. 15, 2022

(51) Int. Cl.

| | |
|---|---|
| ***B65D 23/04*** | (2006.01) |
| ***B01F 23/53*** | (2022.01) |
| ***B01F 27/1125*** | (2022.01) |
| ***B01F 27/118*** | (2022.01) |
| ***B01F 31/441*** | (2022.01) |
| ***B01F 33/501*** | (2022.01) |
| ***B01F 35/32*** | (2022.01) |
| ***B65D 43/02*** | (2006.01) |
| ***B65D 47/08*** | (2006.01) |
| *B01F 101/14* | (2022.01) |

(52) U.S. Cl.
CPC .............. *B65D 23/04* (2013.01); *B01F 23/53* (2022.01); *B01F 27/1125* (2022.01); *B01F 27/118* (2022.01); *B01F 31/441* (2022.01); *B01F 33/50111* (2022.01); *B01F 35/32021* (2022.01); *B65D 43/0231* (2013.01); *B65D 47/0857* (2013.01); *B01F 2101/14* (2022.01)

(58) Field of Classification Search
CPC .............................. B65D 23/04; B01F 31/441
USPC ........................................ 366/130, 255, 256
See application file for complete search history.

(56) References Cited

U.S. PATENT DOCUMENTS

| | | | | | |
|---|---|---|---|---|---|
| 722,833 | A * | 3/1903 | Furlong | B01F 31/441 | 366/256 |
| 1,174,828 | A * | 3/1916 | Copeland | B01F 33/5011 | D7/300.1 |
| 1,251,878 | A * | 1/1918 | Fay | B01F 31/441 | 366/256 |
| 1,455,664 | A * | 5/1923 | Russell | A47J 43/1081 | 366/256 |
| 2,007,850 | A * | 7/1935 | Drew | A47J 43/27 | 366/256 |
| 2,266,186 | A * | 12/1941 | Fischer | A47J 43/105 | 366/256 |
| 5,894,952 | A * | 4/1999 | Mendenhall | B65D 47/06 | 220/717 |
| 8,534,908 | B2 * | 9/2013 | Rhodes, II | A47J 43/1018 | 366/243 |
| 10,104,994 | B2 * | 10/2018 | Rage | A47G 19/2205 | |
| 10,327,573 | B2 | 6/2019 | Ali et al. | | |
| 10,363,527 | B2 * | 7/2019 | Johnson | B01F 27/113 | |
| 2013/0010568 | A1 * | 1/2013 | Bodum | A47J 43/105 | 366/130 |

(Continued)

*Primary Examiner* — David L Sorkin
(74) *Attorney, Agent, or Firm* — Weiss & Moy, PC; Jeffrey D. Moy

(57) ABSTRACT

A mixing bottle has a container having an open top area. A cover is removably coupled to the container and covering the open top area. A first opening is formed in a top surface of the cover to dispense the contents stored within the container. A second opening is formed in a center area of the top surface of the cover. A mixing device is positioned within the container and extends out of the second opening in the cover.

6 Claims, 4 Drawing Sheets

(56) References Cited

U.S. PATENT DOCUMENTS

2016/0346746 A1 * 12/2016 Rage .................. A47G 19/2272

* cited by examiner

MIXING BOTTLE AND METHOD THEREFOR

TECHNICAL FIELD

The present application generally relates to a bottle, and more specifically, to a mixing bottle that is able to mix a liquid and powder together and selectively dispense the mixture to an end user.

BACKGROUND

Many individuals who like to work out may use supplements to increase performance and/or to help build muscle. Many of these supplements may come as powder additives to be mixed with water or other liquids prior to being consumed by the user. These supplements may include pre-workout, during workout and/or post-workout supplements.

For some of these supplements, it may be recommended that the supplements not be mixed in advance of consumption as the contents of the supplement can denature in the liquid/water over time. As a result, many individuals may bring a single portion of the powdered supplement with them in a container and add the liquid/water into the container for use. Unfortunately, just shaking the container with the liquid/water does not necessarily remove all the clumps of powder and does not result in a smooth textured drink.

Some specialty mixing bottles may contain a wire structure within the bottle. The wire structure may help to mix the powdered supplement with the liquid in the bottle. To use this style of bottle, a user adds a liquid and supplement powder to the bottle, closes the bottle and shakes the contents. When the bottle is shaken, the wire structure may act as an agitator to help dispense the clumped supplement. These types of bottles have several issues. First, the wire structure is generally stationary and either positioned at the top or bottom of the bottle. The stationary nature of the wire structure may prevent proper mixing of the powder supplement thereby still leaving clumps of powder and does not result in a smooth textured drink.

Another issue is that the wire structure may still require shaking of the bottle to help mix the powdered supplement with the liquid. The shaking of the bottle may cause some of the substance to leak out of the top of the bottle. This may be especially true if the top of the bottle is not properly closed. Finally, if the wire structure is placed near the top of the bottle, besides the issues described above, the wire structure may hinder the drink mixture from freely flowing out of the bottle.

Therefore, it would be desirable to provide a system and method that overcomes the above.

SUMMARY

In accordance with one embodiment, a mixing bottle is disclosed. The mixing bottle has a container having an open top area. A cover is removably coupled to the container and covers the open top area. A first opening is formed in a top surface of the cover to dispense the contents stored within the container. A second opening is formed in a center area of the top surface of the cover. A mixing device is positioned within the container and extends out of the second opening in the cover.

In accordance with one embodiment, a mixing bottle is disclosed. The mixing bottle has a container having an open top area. A cover is removably coupled to the container and covers the open top area. A first opening is formed in a top surface of the cover to dispense the contents stored within the container. A second opening is formed in a center area of the top surface of the cover. A closure lid is hingely coupled to a top surface of the cover. A stopper extends down from a bottom surface of a distal end of the closure lid and is sized to fit within the first opening. A lip extends down from an outer perimeter of the cover, the outer perimeter of the cover being larger than that of the open top of the container. A first threading is formed around an interior of the lip. A second threading is formed around an outer perimeter of the open top of the container. A mixing device is positioned within the container and extends out of the second opening in the cover. A closure lid opening is formed near a proximate end of the closure lid allowing the mixing device to extend up and out of the container and the closure lid opening.

In accordance with one embodiment, a mixing bottle is disclosed. The mixing bottle has a container having an open top area. A cover is removably coupled to the container and covers the open top area. A first opening is formed in a top surface of the cover to dispense the contents stored within the container. A second opening is formed in a center area of the top surface of the cover. A closure lid is hingely coupled to a top surface of the cover. A stopper extends down from a bottom surface of a distal end of the closure lid and sized to fit within the first opening. A lip extends down from an outer perimeter of the cover, the outer perimeter of the cover is larger than that of the open top of the container. A first threading is formed around an interior of the lip. A second threading is formed around an outer perimeter of the open top of the container. A mixing device is positioned within the container and extends out of the second opening in the cover. A closure lid opening is formed near a proximate end of the closure lid allowing the mixing device to extend up and out of the container and the closure lid. The mixing device has a hub. A plurality of blades is provided, wherein a proximate end of each of blade is coupled to the hub. A channel is formed in the hub. A ring member is provided, wherein a distal end of each of the plurality of blades is coupled to the ring member. A rod member has a first end inserted into the channel formed in the hub and a second end extend up and out of the container and the closure lid opening.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

Figure 1:
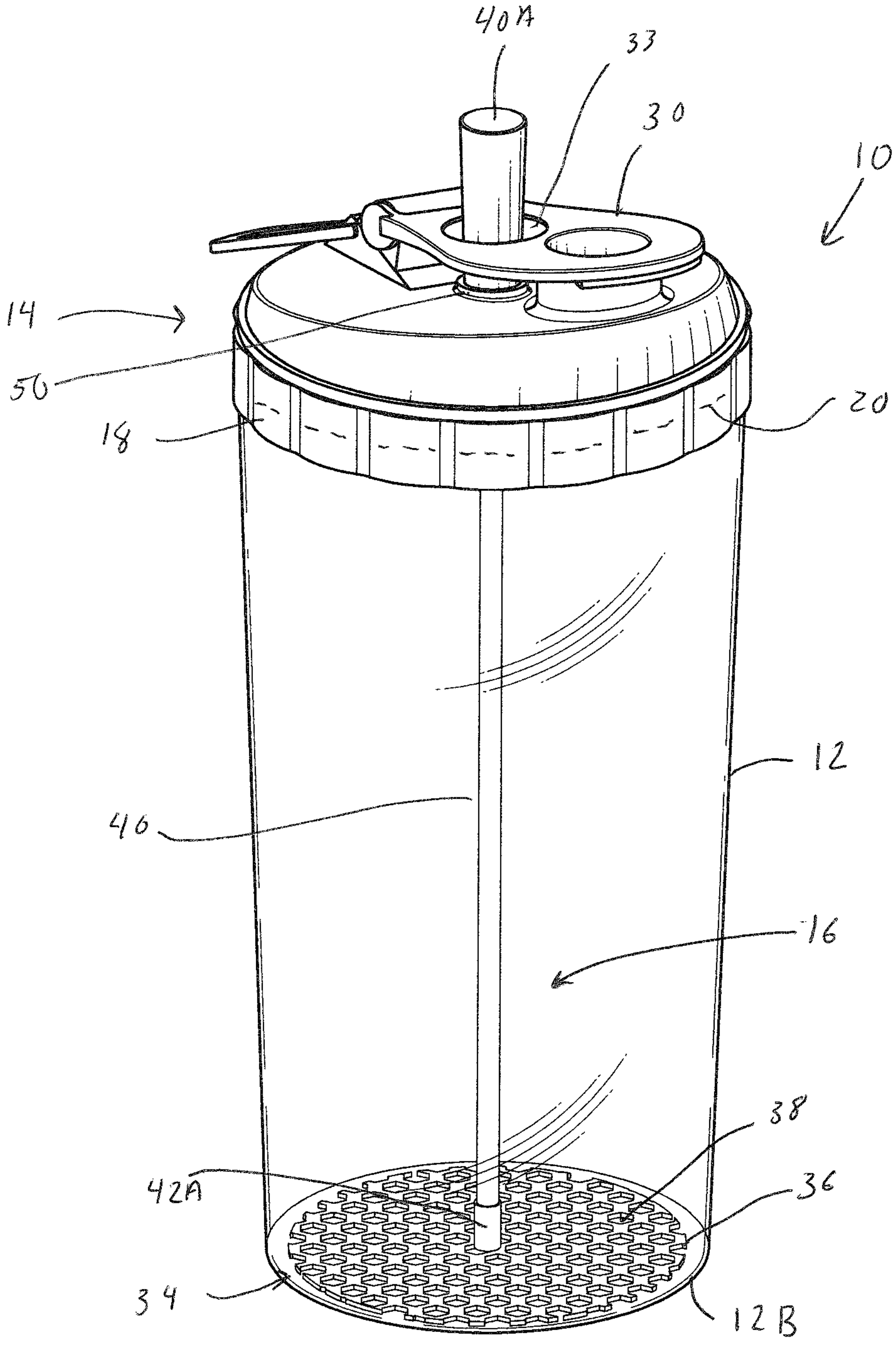
FIG. 1 is a perspective view on an exemplary embodiment of a mixing bottle in accordance with an embodiment of the present invention.
Figure 2:
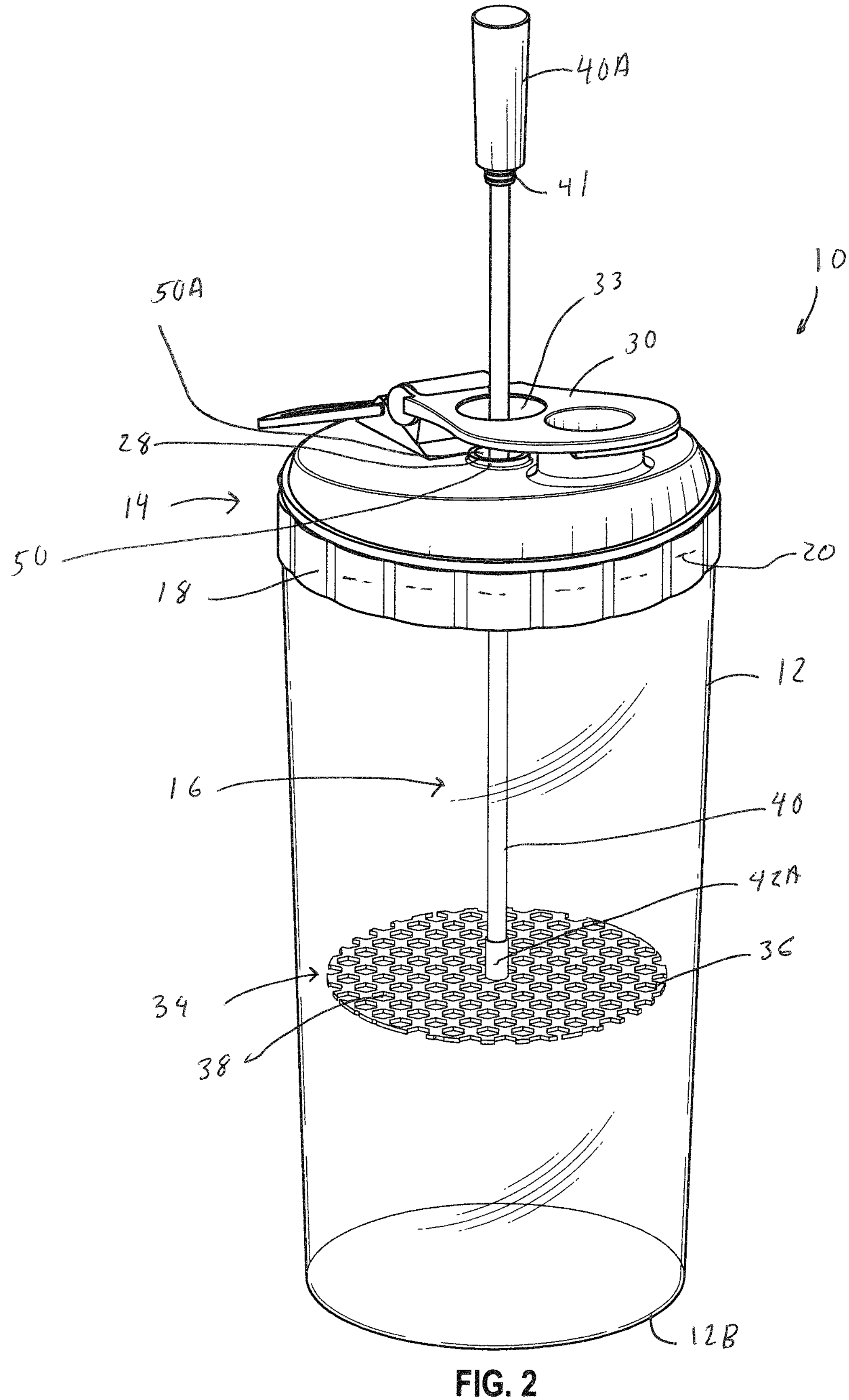
FIG. 2 is a perspective view on an exemplary embodiment of the mixing bottle of FIG. 1 with the mixing device partially raised in accordance with an embodiment of the present invention.
Figure 3:
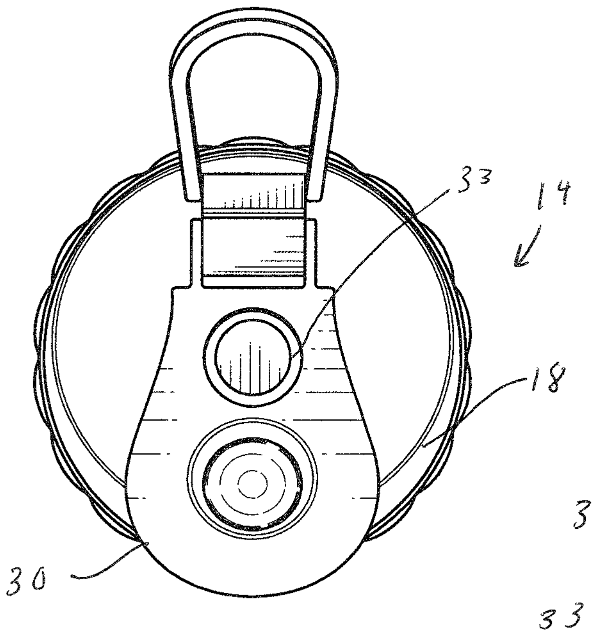
FIG. 3 is a top view on an exemplary embodiment of the mixing bottle of FIG. 1 in accordance with an embodiment of the present invention.
Figure 4:
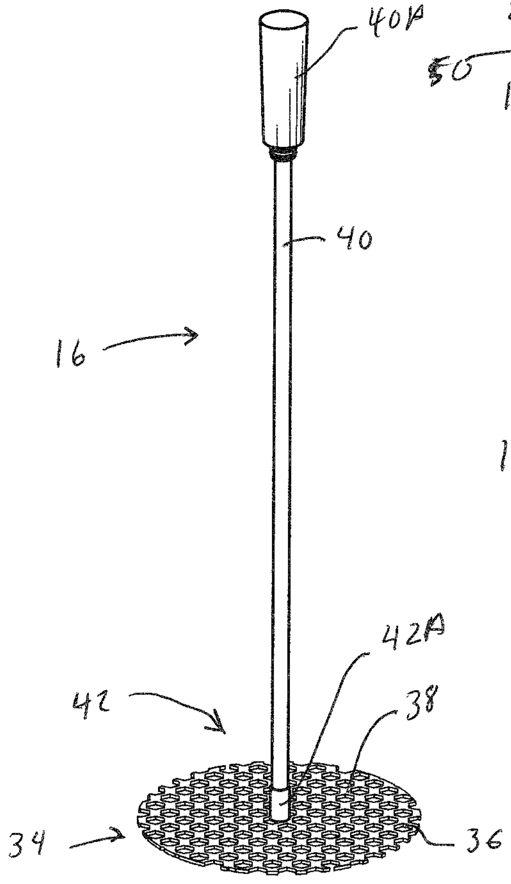
FIG. 4 is a perspective view on an exemplary embodiment of the mixing device used in the mixing bottle of FIG. 1 in accordance with an embodiment of the present invention.
Figure 5:
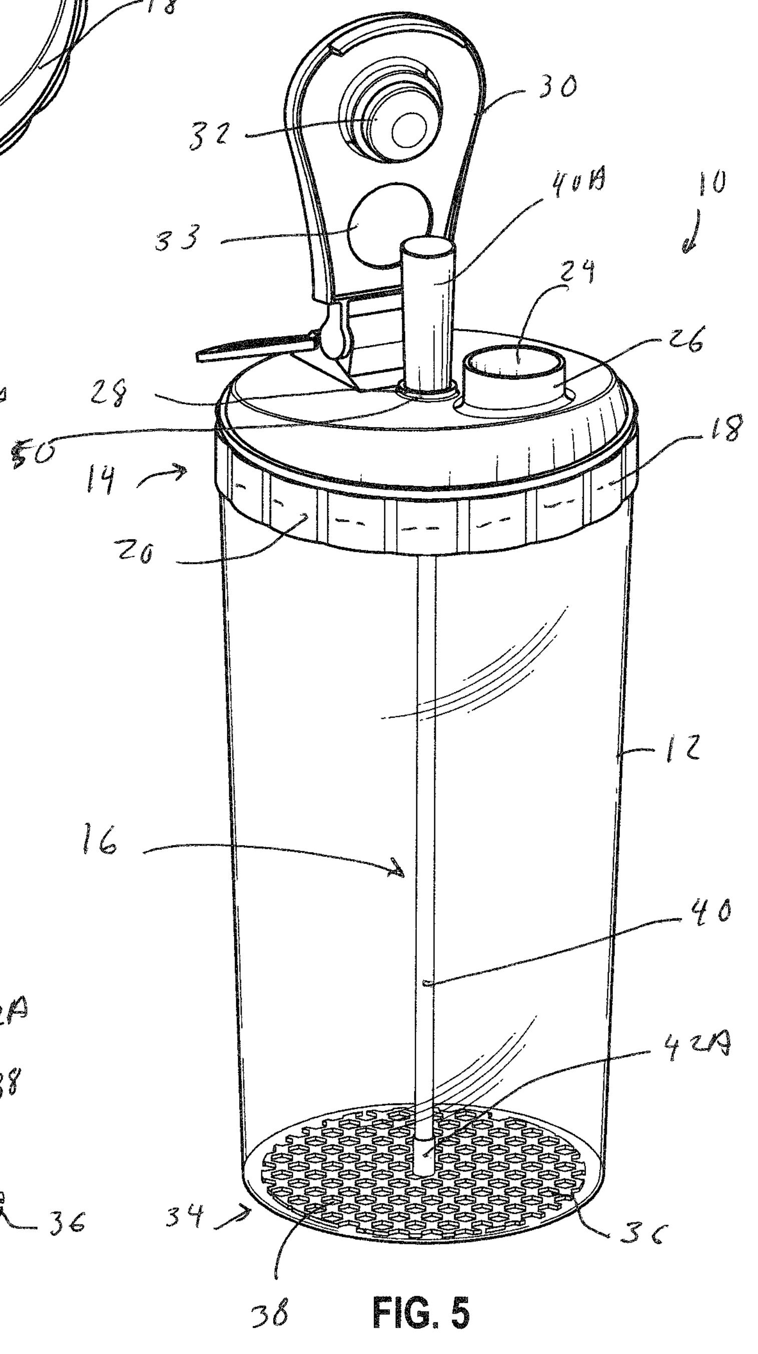
FIG. 5 is a perspective view on an exemplary embodiment of the mixing bottle of FIG. 1 with a top cover open in accordance with an embodiment of the present invention.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary device and method disclose a mixing bottle. The mixing bottle may have a movable mixing device which may be raised and lowered within the mixing bottle to ensure the removal of all clumps of the powder supplement to form a smooth textured drink. In accordance with one embodiment, the movable mixing device may be raised and lowered to generate a fluid vortex within the mixing bottle. The vortex generating a whirlpool which may aid in mixing the powder supplement with the liquid.

Referring to the FIGs., a mixing bottle 10 may be shown. The mixing bottle 10 may be used by an individual to mix a powder with a liquid to form a drink mixture with minimal powder clumps which may freely flow out of the mixing bottle 10. The powder may be a concentrate, a supplement or other types of powder-based drink. The mixing bottle 10 may be formed of a container 12, a cover 14 and a mixing device 16.

The container 12 may be used to hold a mixing solution or liquid, such as water, to be mixed with the powder. Other mixing solutions or liquids may include milk, juices, tea and/or other drinkable liquids. The container 12 may be generally in the shape of a cup and/or tumbler. In the present embodiment, the container 12 may be a cylindrical container having a closed bottom area 12B and an open top 12A. The container 12 may be a variety of other shapes and/or sizes without departing from this invention.

The container 12 may include a cover 14. The cover 14 may be removably attached to the open top 12A of the container 12. When attached to the open top 12A of the container 12, the cover 14 may seal the open top 12A of the container 12. In the present embodiment, the cover 14 may be rotatably coupled to the open top 12A of the container 12. In this embodiment, the cover 14 may have a lip 18 extending down around an outer perimeter of the cover 14. The outer perimeter of the cover 14 may be slightly larger than that of the open top 12A of the container 12 so that the cover 14 may fit over the open top 12A. An interior of the lip 18 may have threading 20. The threading 20 may engage threading 22 formed around an outer perimeter of the open top 12A of the container 12 thereby removably securing the cover 14 to the container 12. The above is one example of how the cover 14 may be removably coupled to the container 12. The cover 14 may be removably attached to the open top 12A of the container 12 in other manners without departing from this invention. For example, the lip 18 of the cover 14 may be slightly smaller than the open top 12A of the container 12 and may slide into the open top 12A like a stopper or other types of closures may be used.

Located on a top surface of the cover 14 may be an opening 24. The opening 24 may be used to dispense the drink mixture from the mixing bottle 10. The opening 24 may be formed along an outer perimeter of the top surface of the cover 14. In accordance with one embodiment, a lip member 26 may extend up from around an outer perimeter of the opening 24. The lip member 26 may allow for the drink mixture to more easily be drunk by the user.

Another opening 28 may be formed in a central area of the top surface of the cover 14. The opening 28 may be used for multiple purposes. The opening 28 may be used to allow the user to move the mixing device 16 in an up and down manner. The opening 28 may further act as a ventilation opening. The opening 28 may allow air to enter the mixing bottle 10 allowing the drink mixture to more easily flow out of the opening 24.

The cover 24 may have a closure lid 30. The closure lid 30 maybe hingely coupled to the top surface of the cover 14. The closure lid 30 may have a stopper 32. The stopper 32 may extend down from a bottom surface of a distal end of the closure lid 30. The stopper 32 may be sized to fit within the opening 24 thereby closing the opening 24 and preventing any contents within the mixing bottle 10 from leaking out of the opening 24. In accordance with one embodiment, the stopper 32 may be formed of a rubberized material.

The closure lid 30 may have an opening 33 formed there through. The opening 33 may be formed near the proximate end of the closure lid 30. The opening 33 may be used to allow the mixing device 16 to extend up and out of the container 12 and cover 14 and to allow a user to raise and lower the mixing device 16 when the closure lid 30 is down.

The mixing device 16 may be positioned within the container 12 and extend out of the opening 28 formed in the cover 14 and the opening 33 formed in the closure lid 30. The mixing device 16 may be raised and lowered within the container 12 thereby mixing the powder with the liquid in the container 12 to form a drink mixture with minimal powder clumps which may freely flow out of the mixing bottle 10.

The mixing device 16 may be formed of an agitator 34. The agitator 34 may be used to mix the powder with the liquid in the container 12. The agitator 36 may be similar in shape and size to the bottom area of the container 12. Thus, in the embodiment shown, the agitator 36 may be circular in shape and have a diameter slightly smaller than that of the container 12. This may allow the agitator 36 to be moved in an up and down manner within the container 12.

In the present embodiment, the agitator 34 may be formed of a plate 36. The plate 36 may have a plurality of openings 38 formed therethrough. The openings 38 may be formed in an array similar to a honeycomb. The openings 38 may allow one to more easily raise and lower the agitator 36 within the container 12. As the plate 36 is moved in an up and down motion, the drink mixture may flow through the openings 38 mixing the powder and the liquid together. Moving the plate 36 in the up and down manner may also generate a whirlpool affect with the drink mixture within the container 12 also aiding in the mixing the powder and the liquid together.

In order to move the plate 36 in an up and down motion, a rod 40 may be attached to the plate 36. In general, the rod

40 may be coupled to a central area of the plate 36. In accordance with one embodiment, a female connector 42 may be formed in the central area of the plate 36. The female connector 42 may have a tubular member 42A. One end of the rod 40 may be inserted into the tubular member 42A to secure the rod 40 to the plate 36. To ensure a secure fitting, the end of the rod 40 secured to the tubular member 42A may be threaded and engage threading on an interior of the tubular member 42A. The other end of the rod 40 may have a handle 40A. The handle 40A may extend up and through the opening 28 formed in the cover 14 and the opening 33 formed in the closure lid 30 when the closure lid 30 of the cover 14 is lowered to close the opening 24.

Figure 6:
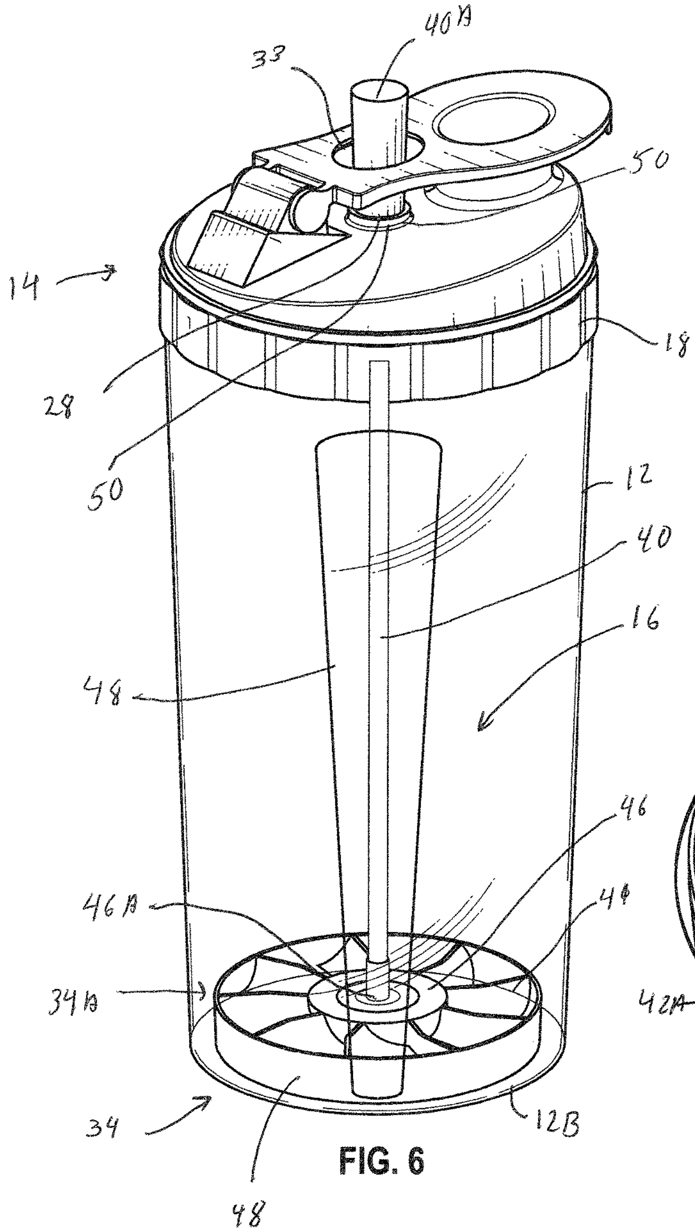
FIG. 6 is a perspective view on an exemplary embodiment of the mixing bottle of FIG. 1 with a propeller mixing device in accordance with an embodiment of the present invention.
Figure 7:
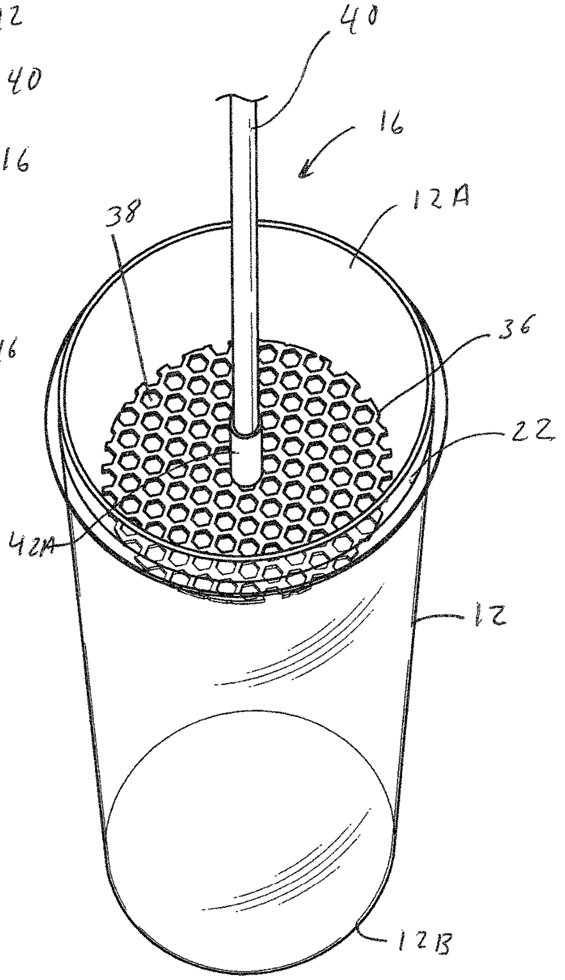
FIG. 7 is a perspective view on an exemplary embodiment of the mixing bottle of FIG. 1 with the mixing device raised and the top cover removed in accordance with an embodiment of the present invention.

In accordance with one embodiment as may be shown in FIG. 6, the agitator 34 may be a propellor agitator 34A. The propellor agitator 34A may have a plurality of blades 44. A proximate end of each of blade 44 may be coupled to a hub 46. A distal end of each of the plurality of blades 44 may be coupled to ring member 48. One end of the rod 40 may be inserted into the channel 46A formed in the hub 46 to secure the rod 40 to the propeller agitator 34A. To ensure a secure fitting, the end of the rod 40 secured to the hub 46 may be threaded and engage threading on an interior of the channel 46A of the hub 46.

Raising and lowering the propellor agitator 34A may cause the plurality of blade 44 to stir the drink mixture flowing through the propellor agitator 36A mixing the powder and the liquid together. Moving the propellor agitator 36A in the up and down manner may also generate a whirlpool/vortex 48 affect with the drink mixture within the container 12 also aiding in the mixing of the powder and the liquid together.

In operation, the user may remove the cover 14 from the open top 12A of the container 12. The user may add the mixing solution/liquid, such as water into the container 12. The user may then add the powder to the container 12 and then attach the cover 14 to the open top 12A of the container 12. With the closure lid 30 of the cover 14 closing the opening 24, the user may grab the handle 40A of the mixing device 16 and move the agitator 34 in an up and down manner by raising and lowering the rod 40 of the mixing device 16 thereby mixing the powder with the mixing solution/liquid, in the container 12. In accordance with one embodiment, a rubber washer 50 may be formed around the opening 28. The washer 50 may be used to keep the mixing solution/liquid and the powder within the container 12. The washer 50 may have threads 50A which may engage threads 41 formed on the handle 40A. This may allow one to lock the rod 40 in place to prevent leaking if the device 10 is turned upside down, etc. Once the powder is dissolved within the mixing solution/liquid to form the drink mixture, the user may lift the closure lid 30 so that the stopper 32 is removed from the opening 24 allowing the drink mixture to be dispensed from the opening 24.

The foregoing description is illustrative of particular embodiments of the application, but is not meant to be a limitation upon the practice thereof. The following claims, including all equivalents thereof, are intended to define the scope of the application.

What is claimed is:

1. A mixing bottle comprising:

a container having an open top area;

a cover removably coupled to the container and covering the open top area;

a first opening formed in a top surface of the cover to dispense the contents stored within the container;

a second opening formed in a center area of the top surface of the cover; and a mixing device positioned within the container and extending out of the second opening in the cover, wherein the mixing device comprises:

an agitator;

a rod member having a first end coupled to a center area of the agitator and a second end extend up and out of the container and cover;

a plate member circular in shape and have a diameter to fit within the container and allowing the agitator to be moved in an up and down manner within the container; and a plurality of hexagonal openings formed through the plate member, wherein the plurality of openings form a honeycomb shape array of openings, movement of the plate in an up and down manner allowing the contents in the container to flow through the honeycomb shape array of openings mixing the content; and a handle coupled to a distal end of the rod member;

a closure lid hingely coupled to a top surface of the cover;

a stopper extending down from a bottom surface of a distal end of the closure lid and sized to fit within the first opening; and a closure lid opening formed near a proximate end of the closure lid allowing the mixing device to extend up and out of the container and cover.

2. The mixing bottle of claim 1, comprising:

a lip extending down from an outer perimeter of the cover, the outer perimeter of the cover larger than that of the open top of the container;

a first threading formed around an interior of the lip; and a second threading formed around an outer perimeter of the open top of the container.

3. A mixing bottle comprising:

a container having an open top area;

a cover removably coupled to the container and covering the open top area;

a first opening formed in a top surface of the cover to dispense the contents stored within the container;

a second opening formed in a center area of the top surface of the cover;

a closure lid hingely coupled to a top surface of the cover;

a stopper extending down from a bottom surface of a distal end of the closure lid and sized to fit within the first opening;

a lip extending down from an outer perimeter of the cover, the outer perimeter of the cover larger than that of the open top of the container;

a first threading formed around an interior of the lip;

a second threading formed around an outer perimeter of the open top of the container; and a mixing device positioned within the container and extending out of the second opening in the cover, the mixing device having a plurality of hexagonal openings, wherein the plurality of openings form a honeycomb shape array of openings, movement of the mixing device in an up and down manner allowing the contents in the container to flow through the honeycomb shape array of openings mixing the content; and a closure lid opening formed near a proximate end of the closure lid allowing the mixing device to extend up and out of the container and the closure lid opening.

4. The mixing bottle of claim 3, wherein the mixing device comprises:

an agitator; and a rod member having a first end coupled to a center area of the agitator and a second end extend up and out of the container and the closure lid opening.

5. The mixing bottle of claim 4, comprising a handle coupled to a distal end of the rod member.

6. The mixing bottle of claim 4, wherein the agitator comprises:

a plate member circular in shape and have a diameter to fit within the container and allowing the agitator to be moved in an up and down manner within the container, wherein the plurality of openings are formed through the plate member.

* * * * *